May 16, 1961 D. L. FEASTER 2,984,126
GEAR MECHANISM
Filed May 28, 1958 2 Sheets-Sheet 1
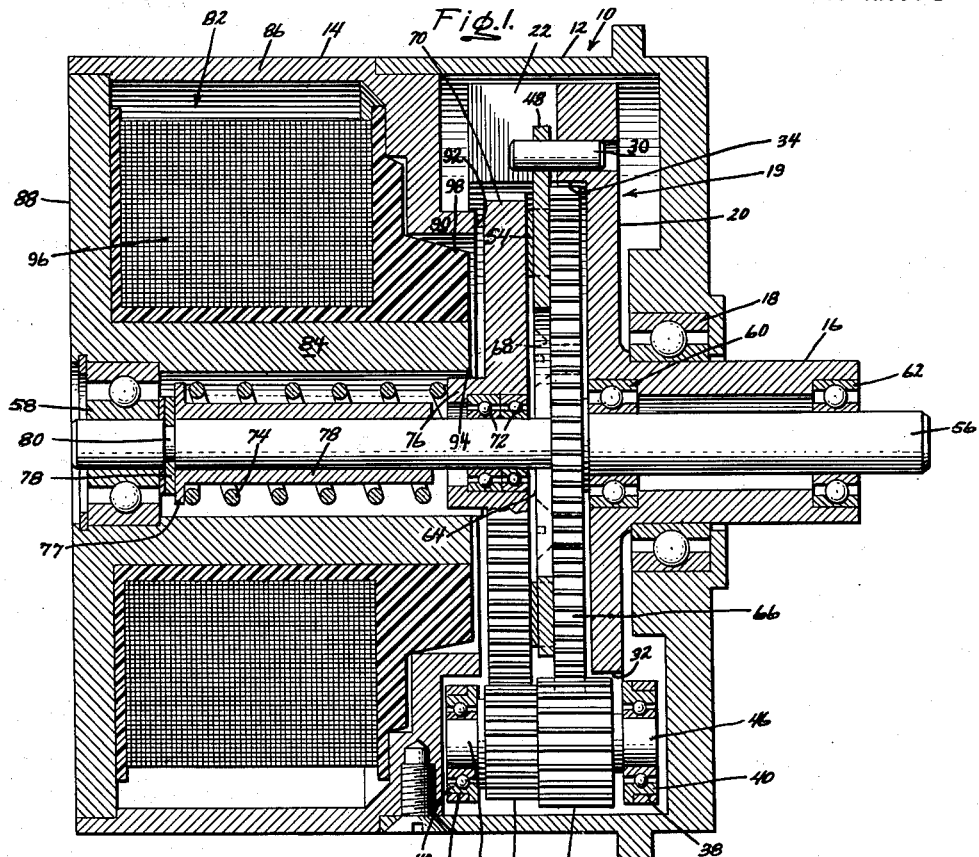
Inventor:
Donavon L. Feaster,
by Gust & Diish
Attorneys.

May 16, 1961 D. L. FEASTER 2,984,126
GEAR MECHANISM

Filed May 28, 1958 2 Sheets-Sheet 2

Inventor:
Donavon L. Feaster,
by Hust & Dish
Attorneys

United States Patent Office 2,984,126
Patented May 16, 1961

2,984,126
GEAR MECHANISM

Donavon L. Feaster, New Haven, Ind., assignor to Bowmar Instrument Corporation, Fort Wayne, Ind.

Filed May 28, 1958, Ser. No. 738,411

17 Claims. (Cl. 74—781)

The present invention relates to a gear mechanism and more particularly to a gear mechanism which employs a planetary gear train actuable between two different operating conditions by means of a magnetic actuator. Gear mechanisms which employ planetary or epicyclic gear trains are common and have been frequently employed in speed-changing transmissions for different purposes. For the most part, the design of these prior art mechanisms has not been concerned to any appreciable extent with a miniaturized unit which achieves maximum efficiency and reliable operation at exceptionally high speeds for a given torque. This invention is, therefore, directed toward the provision of a miniaturized gear mechanism or speed changer, highly specialized as to its end use, which may be operated at exceptionally high speeds for a given torque with maximum efficiency and reliability.

It is an object of this invention to provide a gear mechanism which is small in size yet operates with maximum efficiency, reliability and speed for a given torque requirement.

It is another object of this invention to provide a gear mechanism which employs a planetary gear train having coaxial input and output shafts.

It is another object of this invention to provide a speed changer which employs in combination a magnetic actuator and a planetary gear train so constructed and arranged as to operate with maximum efficiency and reliability, yet be small in size.

It is still another object of this invention to provide in a gear mechanism a uniquely designed pinion-carrier which occupies a minimum of space for a given speed and torque requirement.

It is still another object of this invention to provide a magnetic actuator for a speed changer wherein residual magnetism in the actuator does not interfere with the proper operation of the speed changer.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a longitudinal sectional view of one embodiment of this invention;

Fig. 2 is an end view of the open-faced carrier used in the device of Fig. 1;

Fig. 3 is a sectional illustration taken substantially along section line 3—3 of Fig. 2;

Figure 4:
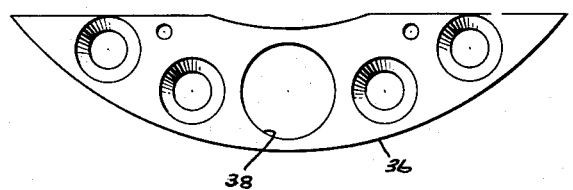
Fig. 4 is a side view of a bearing plate which is normally secured to the carrier of Figs. 2 and 3.
Figure 5:
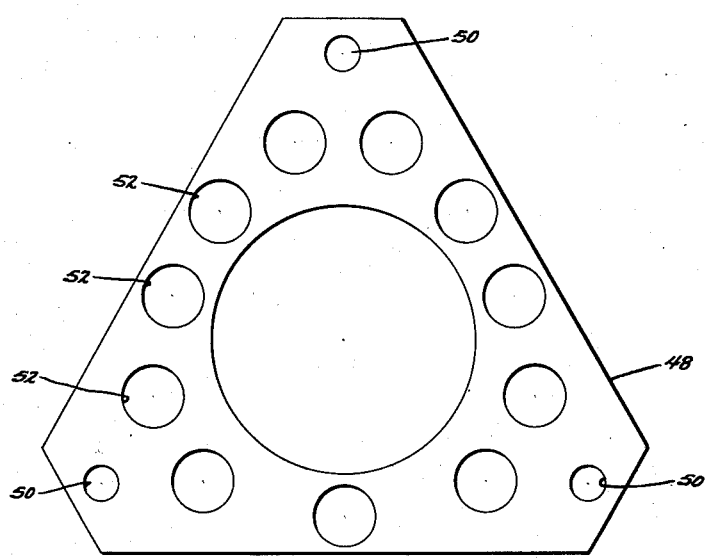
Fig. 5 is an illustration of the clutch plate used in the mechanism of Fig. 1.

Referring to the drawings, and more particularly to Fig. 1, the mechanism therein shown is a speed-changer which may be operated to deliver either one of two possible speed ratios upon selective actuation thereof. This mechanism is exceedingly small, the overall dimension as to length approximating one and one-half (1½) inches and the outside dimensions being approximately one and one-half (1½) inches also. The mechanism comprises a unitary housing 10 of cylindrical shape which is divided into two mating sections 12 and 14. The section 12 surrounds and encloses a planetary gear train which will be described in detail in the following, while the section 14 constitutes a part of an electromagnetic actuator also to be described in more detail.

A tubular shaft 16, which in the preferred embodiment of this invention is termed the input shaft, is coaxially mounted inside the housing section 12 by means of a suitable ball bearing assembly 18. On the inner end of this shaft 16 integrally forming a part thereof, is a pinion-carrier identified generally by the reference numeral 19. This carrier 19 is shown in detail in Figs. 2 and 3 and comprises a disc 20 which carries on its outer peripheral portion three axially extending segments 22, 24 and 26. These segments are arcuately shaped and equally circumferentially spaced on the disc 20 with three tapered clutch-mounting flats 28 of substantially equal size therebetween. Axially projecting from each of these flats is a fixedly secured clutch-mounting pin 30 having a purpose which will be described hereinafter.

The two segments 22 and 24 are preferably identical and integal with the disc 20. The segment 26 is substantially identical in size to the other two segments, but it is provided with an axially extending pinion-receiving opening 32 (see Fig. 3). This opening 32 is cylindrical in shape and of such size that it opens through the inner wall of the segment 26 for receiving the teeth of meshing gears therethrough. Each of the segments 22, 24 and 26 are internally machined so as to provide a cylindrical gear-receiving recess as indicated by the reference numeral 34.

Two bearing plates 36 such as the one shown in Fig. 4 are screw mounted on opposite sides of the carrier segment 26. These plates are substantially identical in shape to that of the segment 26 and therefore resemble an axial extension of the segment.

The two plates are provided with stepped diameter openings 38 for receiving two ball bearing assemblies 40 as shown in Fig. 1. A transfer pinion comprising two pinions 42 and 44 mounted end to end and fixed to a pinion shaft 46 is received in the carrier opening 32 with the opposite ends of the pinion shaft 46 being journaled in the two bearings 40. By means of this mounting, the transfer pinion 42, 44 is supported on the carrier 19 yet is free to rotate in the bearings 40. In the illustrated embodiment of Fig. 1, the pinion 42 is smaller than the pinion 44; however, as will appear obvious to a person skilled in the art, these sizes may be reversed or may even be the same without departing from the spirit and scope of this invention.

Referring now to Figs. 1, 2, 3 and 5, a clutch plate 48 (Fig. 5) of triangular shape is mounted on the carrier flats 28 by means of three mounting apertures 50 which slidably receive the mounting pins 30. The center of this plate is open so as to clear other mechanism to be described later and has a plurality of annularly arranged openings 52 which have press-fitted thereinto a plurality of neoprene or the like buttons or pads 54. Preferably, these buttons 54 have a greater length than the thickness dimension of the clutch plate 48, this length contributing to the operating reliability of the mechanism as will be explained later.

Coaxially mounted inside the tubular shaft 16 is a solid shaft 56 which in the illustrated embodiment of the invention is preferred as the output shaft. This shaft 56 extends completely through the housing, being journaled in the housing at its left-hand end by means of a ball bearing assembly 58. The right-hand end of the shaft 56 is journaled for rotation in the tubular shaft 16 by means of two, axially spaced ball bearing assemblies 60 and 62 mounted on opposite sides of the bearing 18. By means of this mounting, the shaft 56 is free to rotate relative to the housing as well as to the shaft 16.

Provided on the shaft 56 in radial registry with the clutch plate 48 is an integral flange or collar 64. On this collar 64 is mounted a spur gear 66 by means of a series of circumferentially arranged screws 68. By means of this mounting, the gear 66 is fixedly secured to and rotatable with the shaft 56.

The gear 66 is meshed with the transfer pinion 44 so that by holding the shaft 16 stationary, rotation of the output shaft 56 will cause rotation of the pinion 44.

This gear 66 is received between the clutch plate 48 and the carrier disc 20, the outer perimeter of the gear having only minimum clearance spacing from the wall of the gear-receiving recess 34 (see Fig. 3). It is well to note at this point that the pinion shaft 46 is positioned as far radially outwardly on the carrier 19 as is possible without impairing the strength of the mounting. Also, it will be noted that the inner wall of the housing is disposed immediately adjacent the pinion 44. Thus, only minimum clearances and tolerances are present.

A gear wheel 70, meshed with the pinion 42, is rotatably and axially slidably mounted on the shaft 56 on the left-hand side of the collar 64 by means of suitable ball bearing assemblies 72. The opposite sides of this gear 70 are preferably parallel and normal to the shaft axis so that uniform engagement of these sides with different parts of the mechanism is made possible. For example, the right-hand side of the gear 70 is uniformly, frictionally engageable with the clutch buttons 54, this engagement being effected by means of a compression spring 74 which bears at one end against the gear hub 76 and at the other end against the flange 77 of a centering sleeve 78 rotatably mounted on the shaft 56. The left-hand end of the flange 77 bears against a lock ring or retaining washer 78 fitted into a groove 80 in the shaft.

The spring 74 is selected to have a force sufficient frictionally to lock the gear 70 against the clutch buttons 54. This being true, the entire gear assembly thus far described is locked against relative rotation so that rotation of the shaft 16 results in direct rotation of shaft 56. In this condition, the shaft 56 is essentially locked for rotation to the shaft 16.

By withdrawing the gear 70 from frictional engagement with the clutch buttons 54, and locking this gear against rotation, the two gears 70 and 66 become relatively rotatable. In this condition, rotation imparted to the shaft 16 will result in like rotation of the shaft 56. The speed and direction of this rotation of shaft 56 will, of course, depend upon the gear ratio of the meshing gears and pinions. This relative rotation between the two shafts 16 and 56 may be better understood by considering the shaft 16 as having imparted thereto a clockwise rotation. This results in similar rotation of the carrier 19 as well as the pinion shaft 46. Since the pinion 42 is meshed with the gear 70 and the gear 70 is locked against rotation, the pinion 42 will be rotated clockwise in the carrier bearings 40 as well as being orbited clockwise about the shaft 16 axis. This rotation of the pinion 42 is transferred to the pinion 44 which, in turn, by reason of its being meshed with the gear 66 causes the latter to rotate clockwise, assuming the same number of teeth on pinions 42 and 44 and one tooth less on gear 66 than on gear 70. This gear 66 being secured to the shaft 56 causes the latter to rotate in a clockwise direction.

The gear 70 is selectively locked against rotation by means of an electromagnetic actuator as indicated by the reference numeral 82. This actuator comprises two magnetic pole members 84 and 86 of tubular shape. The pole member 86 constitutes the housing section 14 and is of thinner section than the pole member 84 so as to provide the same magnetic reluctance or permeability, in the two poles. The left-hand ends of these two poles 84 and 86 are connected together by means of an annular end plate 88 of such thickness as to provide essentially the same reluctance as the individual poles 84 and 86. These pole members and end plate are, of course, made of magnetic material.

The right-hand end of the pole member 86 is formed radially inwardly into a smaller diameter pole section 90. The right-hand end of this pole section is machined flat to provide a pole surface 92 which is normal to the shaft axes. As will be seen in Fig. 1, the diameter of this pole surface 92 is substantially the same as the diameter of the gear wheel 70, this surface 92 being juxtaposed with respect to the outer peripheral edge of the side of the gear.

The right-hand end of the inner pole member 84 terminates in a flat face 94 which is substantially radially aligned with respect to the pole face 92 but which is slightly shorter so as to provide an air gap between this end 94 and the gear 70 when the latter is engaged with the outer pole face 92. The radial spacing between the pole section 90 and the inner pole member 84, must be, in any event, sufficiently great in comparison with the air gap just described so that when the gear 70 is engaged with the pole face 92, the magnetic flux will pass from the pole member 84 into the gear 70 and from there into the pole section 90 instead of bridging the space between the pole member 84 and the pole section 90. Still further, this air gap must be small as compared to the radial spacing between the pole member 84 and the gear hub 76. Also, this gap must be small as compared to the spacing between the pole member 84 and the spring 74 with its associated centering sleeve 78. As will now be apparent, the various spacings between the elements which enter into the magnetic circuitry must be such, in order to obtain maximum efficiency in actuator operation, that with the gear 70 engaged with the outer pole face 92, even though an air gap is provided between the inner pole face 94 and the gear 70, essentially all of the flux emanating from the pole face 94 will pass into the gear 70 instead of leaking to other magnetic parts which could provide a return path. The exact size of this air gap will be explained in more detail hereinafter.

A helical winding or magnetizing coil 96 essentially fills the space between the two pole members 84 and 86, but is impregnated with or potted in a suitable plastic material, such as Teflon, for providing a hermetic seal. Also, this plastic potting secures the coil 96 in place. The potting material, however, is molded or formed at its right-hand end in an annular, tapered projection 98 which conforms essentially to the inner diameter of the pole section 90, the base or left-hand end of this projection 98 being slightly larger than this inner diameter so as to provide a hermetic seal by engagement therebetween. By means of this structure, the coil 96 is hermetically sealed in the space between the two poles 84 and 86.

When the coil 96 is energized, the right-hand ends of the two pole members 84 and 86 assume opposite polarities and draw the gear 70 into engagement with the pole face 92 in opposition to the force of the spring 74. De-energization of the coil 96 results in release of the gear 70 with the spring 74 forcing the gear to its illustrated position in engagement with the clutch buttons 54. When the coil 96 is energized, and the gear 70 is engaged with the pole face 92, as explained previously an air gap is provided between the inner pole end 94 and the gear. If no such air gap were provided, and the gear 70 were permitted to engage the pole face 94, residtial magnetism in the magnetic circuit, remaining after de-energization of the coil 96, would hold the gear 70 in place, the force of this residual magnetism exceeding the available force of the spring 74. However, by providing an air gap of sufficient width to overcome this sticking due to the residual magnetism, the spring 74 is able to force the gear 70 against the clutch pads 54. Of course, this air gap cannot be too wide, since this would destroy the magnetic circuit and would interfere with the ability of the magnet to move the gear 70 leftward.

Recapitulating the operation of the invention described, with the coil 96 unenergized, clockwise rotation of the input shaft 16 is directly imparted to the output shaft 56. Energization of the coil 96, however, slides the gear 70 on the shaft 56 against the pole face 92, thereby locking the gear 70 against rotation and holding it out of engagement with the clutch pads or buttons 54. Clockwise rotation of the input shaft 16 at this point results in orbiting the transfer pinions 43, 44 which in turn impart like rotation to the gear 66 and the shaft 56. De-energization of the coil 96 results in almost instantaneous release of the gear 70 and the forceful engagement thereof with the clutch pads 54 resulting in the gear train being locked together for synchronous rotation.

The design of this invention as just described is unique for the reason that there is little or no unused space in the entire mechanism. Stating the same in other words, the planetary gear mechanism with its associated electrical actuator occupies a minimum of space for given speed and torque requirements. The particular carrier 19 construction permits the use of the largest possible gear 66. By reason of the mounting plates 36, assembly and disassembly of the transfer pinions 42, 44 are facilitated, but additionally, it is possible to use relatively coarse and deep teeth in the pinions and the meshed gears for satisfying torque load requirements while still maintaining relatively high speeds and shaft rotation. Like the gear 66, the gear 70 can be made suitably large in diameter which is important in achieving maximum efficiency of operation in the electromagnetic actuator 82. This efficiency results from the fact that the pole section 90 is positioned opposite the outer periphery of the gear 70 which provides a relatively large moment arm between the axis of the gear 70 and the point of engagement between the gear and the pole face 92. This greater moment arm reduces the power requirements in the actuator 82, which is an exceedingly important accomplishment when only minute quantities of power are available to operate the mechanism.

As explained earlier, the clutch buttons or pads 54, because of the natural resiliency, are movable in the respective openings 52. This is important, because if the buttons are not precisely positioned in the respective openings, engagement by the gear 70 moves all of the buttons enough so that uniform engagement of all buttons with the gear 70 results.

The coaxial relationship between the input and output shafts 16 and 56, respectively, constitutes an advantage over prior art mechanisms which either reverse these shafts as to input and output or positions the shafts laterally with respect to each other. Speed changers of the character herein described find a most useful purpose as a part of an overall driving mechanism wherein gear teeth provided on the shafts 16 and 56 are meshed with companion gears in another gear assembly. With such an envisaged arrangement, disassembly or disengagement of the speed changer of Fig. 1 from the companion gear unit is possible by merely withdrawing or moving the assembly of Fig. 1 toward the left. This removal is straight forward and simple since there are no meshed gears or other mechanisms with which the shafts 16 and 56 can conflict during removal.

The structure is relatively free of friction, since it accommodates the use of ball bearing assemblies at the points and places where they are most needed. This, of course, still further improves the overall operating efficiency and reliability and reduces the amount of power required for energizing the actuator 82.

The carrier 19 possesses the important feature of being dynamically balanced, the two carrier segments 22 and 24 having sufficient mass properly distributed so as to counterbalance the pinion and bearing assembly mounted on the third segment 26. Being so balanced, the carrier 20 may be rotated at extremely high speeds for long periods of time without causing excessive wear in the mechanism.

By way of example only, and not to be considered as a limitation regarding the scope and coverage of the invention as defined by the claims, dimensions for a representative number of the parts are given in the following, the purpose of giving these dimensions being to exemplify the miniaturized character of the overall structure.

Inside diameter of Housing
  Section _____ 12–1.4375 inches
Gear 66 _____ 78 tooth—80 pitch
Pinion 44 _____ 16 tooth—80 pitch
Gear 70 _____ 65 tooth—72 pitch
Pinion 42 _____ 16 tooth—72 pitch
Inside diameter and outside
  diameter of Pole Face 94 _____ 0.281–0.468 inch
Air gap 94–70 _____ 0.003–0.004 inch
Distance between 84 and 90 _____ 0.344 inch

What is claimed is:

1. A gear mechanism comprising a cylindrical housing of given diameter, an output shaft coaxially disposed inside and rotatably mounted on said housing, a first bearing in one end of said housing mounting said shaft, a tubular input shaft coaxially surrounding and rotatable with respect to the portion of said output shaft adjacent to the other end of said housing, two spaced bearings mounting said input shaft on said output shaft, said input shaft being rotatably supported in said other housing end, a second bearing mounting said input shaft in said other housing end, both shafts projecting from said other housing end; an open-faced carrier in said housing and mounted on said input shaft, said carrier comprising a disc coaxial with said shafts and housing and having three axially extending segments which surround and define a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being of different diameter and having a different number of teeth, said pinions being disposed in said pinion-receiving opening of said carrier on an axis parallel to the shaft axes, two bearing plates fixed to opposite sides of said one carrier segment and having two pinion shaft bearings therein respectively, said pinion shaft bearings receiving the opposite ends of said pinion shaft respectively whereby said pinions are free to rotate relative to said carrier, one of said pinions meshing with said spur gear, the other two carrier segments having a mass which counterbalances said one segment with said pinions mounted therein whereby said carrier is dynamically balanced, an annular clutch plate coaxially positioned against said spur gear and having three radially projecting extensions which are circumferentially equally spaced apart, said extensions each having an aperture which slidably receives a respective one of said clutch-mounting pins, said extensions further registering with the respective clutch-mounting flats, said clutch plate being radially spaced from said output shaft, a plurality of circumferentially arranged openings in said clutch plate, a plurality of rubber-like buttons received by said clutch plate openings and projecting beyond the sides thereof, a gear wheel rotatably mounted and axially slidable on said output shaft, said gear wheel meshing with the other of said two pinions and having a first side surface frictionally engageable with said clutch buttons; an electromagnet in said housing and surrounding said output shaft, said electromagnet having two radially spaced cylindrical pole members, said pole members terminating at one end adjacent to the side of said gear wheel opposite said first side surface, the outer pole member end being annular and engageable with said gear wheel adjacent the outer perimeter of the latter, the inner pole member end being annular, an air gap provided between the annular inner pole member end and said gear wheel when said gear wheel engages said outer pole member, said gear wheel being disengaged from said clutch plate when engaged with said outer pole end, the remote ends of said pole members being connected by a disc of magnetic material, the outer pole member having a reduced diameter cylindrical inner surface adjacent to said gear wheel, a coil substantially fitting the space between said two poles, said coil being embedded in a solid plastic material having a tapered annular projection which enters and seals against said inner cylindrical surface of said outer pole member; and a compression spring inside said inner pole member and surrounding said output shaft, said spring operatively engaging at one end said gear wheel and at the other end said first bearing for yieldably urging said gear wheel against said clutch plate whereby rotation of said input shaft will be imparted directly to said output shaft.

2. A gear mechanism comprising a cylindrical housing of given diameter, an output shaft coaxially disposed inside and rotatably mounted on said housing, a first bearing in one end of said housing mounting said shaft, a tubular input shaft coaxially surrounding and rotatable with respect to the portion of said output shaft adjacent to the other end of said housing, two spaced bearings mounting said input shaft on said output shaft, said input shaft being rotatably supported in said other housing end, a second bearing mounting said input shaft in said other housing end, both shafts projecting from said other housing end; an open-faced carrier in said housing and mounted on said input shaft, said carrier comprising a disc coaxial with said shafts and housing and having three axially extending segments which surround and define a gear-receiving recess, said segments being circumferentialy equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being of different diameter and having a different number of teeth, said pinions being disposed in said pinion-receiving opening of said carrier on an axis parallel to the shaft axes, two bearing plates fixed to opposite sides of said one carrier segment and having two pinion shaft bearings therein respectively, said pininon shaft bearing receiving the opposite ends of said pinion shaft respectively whereby said pinions are free to rotate relative to said carrier, one of said pinions meshing with said spur gear, the other two carrier segments having a mass which counterbalances said one segment with said pinions mounted therein whereby said carrier is dynamically balanced, an annular clutch plate coaxially positioned adjacent said spur gear and having three radially projecting extensions which are circumferentially equally spaced apart, said extensions each having an aperture which slidably receives a respective one of said clutch-mounting pins, said extensions further registering with the respective clutch-mounting flats, said clutch plate being radially spaced from said output shaft, a plurality of circumferentially arranged openings in said clutch plate, a plurality of rubber-like buttons received by said clutch plate openings and projecting beyond the sides thereof, a gear wheel rotatably mounted and axially slidable on said output shaft, said gear wheel meshing with the other of said two pinions and having a first side surface frictionally engageable with said clutch buttons; an electromagnet in said housing and surrounding said output shaft, said electromagnet having two radially spaced cylindrical pole members, said pole members terminating at one end adjacent to the side of said gear wheel opposite said first side, the outer pole member end being annular and engageable with said gear wheel adjacent the outer perimeter of the latter, the inner pole member end being annular, an air gap provided between the annular inner pole member end and said gear wheel when said gear wheel engages said outer pole member, said gear wheel being disengaged from said clutch plate when engaged with said outer pole end, the remote ends of said pole members being connected by a disc of magnetic material, the outer pole member having a cylindrical inner surface adjacent to said gear wheel, and a compresison spring inside said inner pole member and surrounding said output shaft, said spring operatively engaging at one end of said gear wheel and at the other end said first bearing for yieldably urging said gear wheel against said clutch plate whereby rotation of said input shaft will be imparted directly to said output shaft.

3. A gear mechanism comprising a cylindrical housing of given diameter, an output shaft coaxially disposed inside and rotatably mounted on said housing, a tubular input shaft coaxially surrounding and rotatable with respect to the portion of said output shaft adjacent to the other end of said housing, said input shaft being rotatably supported in said other housing end, both shafts projecting from said other housing end; an open-faced carrier in said housing and mounted on said input shaft, said carrier comprising a disc coaxial with said shafts and housing and having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being of different diameter and having a different number of teeth, said pinions being disposed in said pinion-receiving opening of said carrier on an axis parallel to the shaft axes, two bearing plates fixed to opposite sides of said one carrier segment and having two pinion shaft bearings therein respectively, said pinion shaft bearings receiving the opposite ends of said pinion shaft respectively whereby said pinions are free to rotate relative to said carrier, one of said pinions meshing with said spur gear, the other two carrier segments having a mass which counterbalances said one segment with said pinions mounted therein whereby said carrier is dynamically balanced, an annular clutch plate coaxially positioned against said spur gear and having three radially projecting extensions which are circumferentially equally spaced apart, said extensions each having an aperture which slidably receives a respective one of said clutch-mounting pins, said extensions further registering with the respective clutch-mounting flats, said clutch plate being radially spaced from said output shaft, a plurality of circumferentially arranged openings in said clutch plate, a plurality of rubber-like buttons received by said clutch plate openings and projecting beyond the sides thereof, a gear wheel rotatably mounted and axially slidable on said output shaft, said gear wheel meshing with the other of said two pinions and having a first side surface frictionally engageable with said clutch buttons; an electromagnet in said housing and surrounding said output shaft, said electromagnet having two radially spaced cylindrical pole members, said pole members terminating at one end adjacent to the side of said gear wheel opposite said first side, the outer pole member end being annular and engageable with said gear wheel adjacent the outer perimeter of the latter, an air gap provided between the annular inner pole member end and said gear wheel when said gear wheel engages said outer pole member, said gear wheel being disengaged from said clutch plate when engaged with said outer pole end, the opposite ends of said pole members being connected by a disc of magnetic material, the outer pole member having a cylindrical inner surface adjacent to said gear wheel, and a compression spring inside said inner pole member and surrounding said output shaft, said spring operatively engaging at one end said gear wheel and at the other end said first bearing for yieldably urging said gear wheel against said clutch plate whereby rotation of said input shaft will be imparted directly to said output shaft.

4. A gear mechanism comprising a cylindrical housing of given diameter, an output shaft coaxially disposed inside and rotatably mounted on said housing, a tubular input shaft coaxially surrounding and rotatable with respect to the portion of said output shaft adjacent to the other end of said housing, said input shaft being rotatably supported in said other housing end, both shafts projecting from said other housing end; an open-faced carrier in said housing and mounted on said input shaft, said carrier comprising a disc coaxial with said shafts and housing and having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being of different diameter and having a different number of teeth, said pinions being disposed in said pinion-receiving opening of said carrier on an axis parallel to the shaft axes, two bearing plates fixed to opposite sides of said one carrier segment and having two pinion shaft bearings therein respectively, said pinion shaft bearings receiving the opposite ends of said pinion shaft respectively whereby said pinions are free to rotate relative to said carrier, one of said pinions meshing with said spur gear, the other two carrier segments having a mass which counterbalances said one segment with said pinions mounted therein whereby said carrier is dynamically balanced, an annular clutch plate coaxially positioned against said spur gear and having three radially projecting extensions which are circumferentially equally spaced apart, said extensions each having an aperture which slidably receives a respective one of said clutch-mounting pins, said extensions further registering with the respective clutch-mounting flats, said clutch plate being radially spaced from said output shaft, a gear wheel rotatably mounted and axially slidable on said output shaft, said gear wheel meshing with the other of said two pinions and having a first side surface frictionally engageable with said clutch; an electromagnet in said housing and surrounding said output shaft, said electromagnet having two radially spaced cylindrical pole members, said pole members terminating at one end adjacent to the side of said gear wheel opposite said first side, the outer pole member end being annular and engageable with said gear wheel adjacent the outer perimeter of the latter, an air gap provided between the annular inner pole member end and said gear wheel when said gear wheel engages said outer pole member, said gear wheel being disengaged from said clutch plate when engaged with said outer pole end, the opposite ends of said pole members being connected by a disc of magnetic material, the outer pole member having a cylindrical inner surface adjacent to said gear wheel, and a compression spring inside said inner pole member and surrounding said output shaft, said spring operatively engaging at one end said gear wheel and at the other end said first bearing for yieldably urging said gear wheel against said clutch plate whereby rotation of said input shaft will be imparted directly to said output shaft.

5. A gear mechanism comprising a cylindrical housing of given diameter, an output shaft coaxially disposed inside and rotatably mounted on said housing, a tubular input shaft coaxially surrounding and rotatable with respect to the portion of said output shaft adjacent to the other end of said housing, said input shaft being rotatably supported in said other housing end, both shafts projecting from said other housing end; an open-faced carrier in said housing and mounted on said input shaft, said carrier comprising a disc coaxial with said shafts and housing and having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being of different diameter and having a different number of teeth, said pinions being disposed in said pinion-receiving opening of said carrier on an axis parallel to the shaft axes, two bearing plates fixed to opposite sides of said one carrier segment and having two pinion shaft bearings therein respectively, said pinion shaft bearings receiving the opposite ends of said pinion shaft respectively whereby said pinions are free to rotate relative to said carrier, one of said pinions meshing with said spur gear, the other two carrier segments having a mass which counterbalances said one segment with said pinions mounted therein whereby said carrier is dynamically balanced, an annular clutch plate coaxially positioned against said spur gear and having three radially projecting extensions which are circumferentially equally spaced apart, said extensions each having an aperture which slidably receives a respective one of said clutch-mounting pins, said extensions further registering with the respective clutch-mounting flats, said clutch plate being radially spaced from said output shaft, a gear wheel rotatably mounted and axially slidable on said output shaft, said gear wheel meshing with the other of said two pinions and having a first side surface frictionally engageable with said clutch; an electromagnet in said housing and surrounding said output shaft, said electromagnet having two radially spaced cylindrical pole members, said pole members terminating at one end adjacent to the side of said gear wheel opposite said first side, the outer pole member end being annular and engageable with said gear wheel adjacent the outer perimeter of the latter, an air gap provided between the annular inner pole member end and said gear wheel when said gear wheel engages said outer pole member, said gear wheel being disengaged from said clutch plate when engaged with said outer pole end, the opposite ends of said pole members being connected by a disc of magnetic material, the outer pole member having a cylindrical inner surface adjacent to said gear wheel; and means yieldably urging said gear wheel against said clutch plate whereby rotation of said input shaft will be imparted directly to said output shaft.

6. A gear mechanism comprising a cylindrical housing of given diameter, an output shaft coaxially disposed inside and rotatably mounted on said housing, a tubular input shaft coaxially surrounding and rotatable with respect to the portion of said output shaft adjacent to the other end of said housing, said input shaft being rotatably supported in said other housing end, both shafts projecting from said other housing end; an open-faced carrier in said housing and mounted on said input shaft, said carrier comprising a disc coaxial with said shafts and housing and having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being of different diameter and having a different number of teeth, said pinions being disposed in said pinion-receiving opening of said carrier on an axis parallel to the shaft axes, two bearing plates fixed to opposite sides of said one carrier segment and having two pinion shaft bearings therein respectively, said pinion shaft bearings receiving the opposite ends of said pinion shaft respectively whereby said pinions are free to rotate relative to said carrier, one of said pinions meshing with said spur gear, the other two carrier segments having a mass which counterbalances said one segment with said pinions mounted therein whereby said carrier is dynamically balanced, an annular clutch plate coaxially positioned adjacent said spur gear and having three radially projecting extensions which are circumferentially equally spaced apart, said extensions each having an aperture which slidably receives a respective one of said clutch-mounting pins, said extensions further registering with the respective clutch-mounting flats, said clutch plate being radially spaced from said output shaft, a gear wheel rotatably mounted and axially slidable on said output shaft, said gear wheel meshing with the other of said two pinions and having a first side surface frictionally engageable with said clutch; an actuator in said housing and comprising a surface frictionally engageable with said gear wheel adjacent the outer perimeter of the latter whereby said gear wheel may be held against rotation with respect to said input and output shafts; and means yieldably urging said gear wheel against said clutch plate and said clutch plate against said spur gear whereby rotation of said input shaft will be imparted directly to said output shaft.

7. A gear mechanism comprising a cylindrical housing of given diameter, an output shaft coaxially disposed inside and rotatably mounted on said housing, a tubular input shaft coaxially surrounding and rotatable with respect to the portion of said output shaft adjacent to the other end of said housing, said input shaft being rotatably supported in said other housing end, both shafts projecting from said other housing end; an open-faced carrier in said housing and mounted on said input shaft, said carrier comprising a disc coaxial with said shafts and housing and having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship to a pinion shaft, said pinions being disposed in said pinion-receiving opening of said carrier on an axis parallel to the shaft axes, two bearing plates fixed to opposite sides of said one carrier segment and having two pinion shaft bearings therein respectively, said pinion shaft bearings receiving the opposite ends of said pinion shaft respectively whereby said pinions are free to rotate relative to said carrier, one of said pinions meshing with said spur gear, the other two carrier segments having a mass which counterbalances said one segment with said pinions mounted therein, an annular clutch plate coaxially positioned adjacent said spur gear and having three radially projecting extensions which are circumferentially equally spaced apart, said extensions each having an aperture which slidably receives a respective one of said clutch mounting pins, said extensions further registering with the respective clutch-mounting flats, said clutch plate being radially spaced from said output shaft, a gear wheel rotatably mounted and axially slidable on said output shaft, said gear wheel meshing with the other of said two pinions and having a first side surface frictionally engageable with said clutch; means selectively actuable for holding said gear wheel against rotation with respect to said input and output shafts, and means yieldably urging said gear wheel against said clutch plate whereby rotation of said input shaft will be imparted directly to said output shaft.

8. A gear mechanism comprising a housing, an output shaft rotatably mounted in said housing and having one end projection therefrom, a tubular input shaft coaxially surrounding and rotatable with respect to said one shaft end, said input shaft projecting into said housing; an open-faced carrier in said housing and mounted on said input shaft for rotation therewith, said carrier comprising a disc coaxial with said shafts and having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a spur gear coaxially disposed in said gear-receiving recess, said spur gear being fixedly secured to said output shaft, two coaxial pinions fixedly secured in end-to-end relationship and mounted on a pinion shaft, said pinions being disposed in said pinion-receiving opening of said carrier on an axis parallel to the shaft axes, two bearing plates fixed to opposite sides of said one carrier segment for mounting the opposite ends, respectively, of said pinion shaft, one of said pinions meshing with said spur gear, the other two carrier segments counterblancing said one segment and its pinions, a clutch plate loosely surrounding said output shaft adjacent one side of said spur gear, said clutch plate having three angularly spaced openings which slidably receive said clutch mounting pins, respectively; a gear wheel rotatably mounted and axially slidable on said output shaft, said gear wheel being frictionally engageable with said clutch and meshing with the other of said two pinions, means selectively actuable for holding said gear wheel against rotation with respect to said input and output shafts, and means yieldably urging said gear wheel against said clutch plate whereby rotation of said input shaft will be imparted directly to said ouput shaft.

9. A gear mechanism comprising a housing, an output shaft rotatably mounted in said housing and having one end projection therefrom, a tubular input shaft coaxially surrounding and rotatable with respect to said one shaft end, said input shaft projecting into said housing; an open-faced carrier in said housing and mounted on said input shaft for rotation therewith, said carrier comprising a disc coaxial with said shafts and having a pinion-receiving opening adjacent the outer perimeter thereof; a spur gear mounted on said output shaft for rotation therewith and disposed with its periphery adjacent to said pinion-receiving opening, said spur gear being coaxial with respect to said carrier, two coaxial pinions fixedly secured in end-to-end relationship and mounted on a pinion shaft, said pinions being disposed in said pinion-receiving opening on an axis parallel to the shaft axes, two bearing plates fixed to opposite sides of said carrier for mounting the opposite ends, respectively, of said pinion shaft, one of said pinions meshing with said spur gear, a clutch plate loosely surrounding said output shaft adjacent to one side of said spur gear, said clutch plate being mounted on said carrier against rotation but axially slidable relative thereto, a gear wheel rotatably mounted and axially slidable on said output shaft, said gear wheel being frictionally engageable with said clutch and meshing with the other of said two pinions, means selectively actuable for holding said gear wheel against rotation with respect to said input and output shafts, and means yieldably urging said gear wheel against said clutch plate and said clutch plate against said spur gear whereby rotation of said input shaft will be imparted directly to said output shaft.

10. A gear mechanism comprising a housing, an output shaft rotatably mounted in said housing and having one end projection therefrom, a tubular input shaft coaxially surrounding and rotatable with respect to said one shaft end, said input shaft projecting into said housing; an open-faced carrier in said housing and mounted on said input shaft for rotation therewith, said carrier comprising a disc coaxial with said shafts and having a pinion-receiving opening adjacent the outer perimeter thereof; a spur gear mounted on said output shaft for rotation therewith and disposed with its periphery adjacent to said pinion-receiving opening, said spur gear being coaxial with respect to said carrier, two coaxial pinions fixedly secured in end-to-end relationship and mounted on a pinion shaft, said pinions being disposed in said pinion-receiving opening on an axis parallel to the shaft axes, means on said carrier for mounting said pinion shaft, one of said pinions meshing with said spur gear, a clutch plate loosely surrounding said output shaft adjacent to one side of said spur gear, said clutch plate being mounted on said carrier against rotation but axially slidable relative thereto, a gear wheel rotatably mounted and axially slidable on said output shaft, said gear wheel being frictionally engageable with said clutch and meshing with the other of said two pinions, means selectively actuable for holding said gear wheel against rotation with respect to said input and output shafts, and means yieldably urging said gear wheel against said clutch plate whereby rotation of said input shaft will be imparted directly to said output shaft.

11. For use in a gear mechanism, a gear train comprising inner and outer coaxial shafts which are relatively rotatable; a carrier fixedly secured to the outer shaft for rotation therewith, said carrier comprising a disc coaxial with respect to said shafts having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a clutch plate mounted on said flats and having three angularly spaced apertures which slidably receive said clutch-mounting pins, said clutch plate having a plurality of annularly arranged openings, a plurality of rubber-like buttons received in said openings respectively, said buttons projecting from the opposite sides of said clutch plate; a spur gear received by said gear-receiving recess between said clutch plate and said carrier disc, said spur gear being coaxially secured to said inner shaft and frictionally engageable by said clutch plate, two pinions fixedly mounted on a pinion shaft in end-to-end relationship, said pinions being received by said pinion-receiving opening of said carrier, two bearing plates mounted on opposite sides, respectively, of said one segment, said two plates carrying two bearings, respectively, which receive the opposite ends of said pinion shaft whereby said pinions are rotatable with respect to said carrier, one pinion meshing with said spur gear, a gear wheel rotatably and slidably received on said inner shaft, said gear wheel being movable into frictional engagement with said clutch plate and meshing with the other of said pinions, means yieldably urging said gear wheel into frictional engagement with said clutch plate, and actuating means for withdrawing said gear wheel from said clutch plate and to hold said gear wheel against rotation with respect to said inner and outer shafts.

12. For use in a gear mechanism, a gear train comprising inner and outer coaxial shafts which are relatively rotatable; a carrier fixedly secured to the outer shaft for rotation therewith, said carrier comprising a disc coaxial with respect to said shafts having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a clutch plate mounted on said flats and having three angularly spaced apertures which slidably receive said clutch-mounting pins, said clutch plate having a plurality of annularly arranged openings, a plurality of rubber-like buttons received in said openings respectively, said buttons projecting from the opposite sides of said clutch plate; a spur gear received by said gear-receiving recess between said clutch plate and said carrier disc, said spur gear being coaxially secured to said inner shaft, two pinions fixedly mounted on a pinion shaft in end-to-end relationship, said pinions being received by said pinion-receiving opening of said carrier, two bearing plates mounted on opposite sides, respectively, of said one segment, said two plates carrying two bearings, respectively, which receives the opposite ends of said pinion shaft whereby said pinions are rotatable with respect to said carrier, one pinion meshing with said spur gear, a gear wheel rotatably and slidably received on said inner shaft, said gear wheel being movable into frictional engagement with said clutch plate and meshing with the other of said pinions, and means yieldably urging said gear wheel into frictional engagement with said clutch plate.

13. For use in a gear mechanism, a gear train comprising inner and outer coaxial shafts which are relatively rotatable; a carrier fixedly secured to the outer shaft for rotation therewith, said carrier comprising a disc coaxial with respect to said shafts having three axially extending segments which surround a gear-receiving recess, said segments being circumferentially equally spaced apart and separated by clutch-mounting flats, each flat having one axially extending clutch-mounting pin thereon, one segment having an axially extending pinion-receiving opening; a clutch plate mounted on said flats and having three angularly spaced apertures which slidably receive said clutch-mounting pins, said clutch plate having a plurality of annularly arranged openings, a plurality of rubber-like buttons received in said openings respectively, said buttons projecting from the opposite sides of said clutch plate; a spur gear received by said gear-receiving recess between said clutch plate and said carrier disc, said spur gear being coaxially secured to said inner shaft, two pinions fixedly mounted on a pinion shaft in end-to-end relationship, said pinions being received by said pinion-receiving opening of said carrier, two bearing plates mounted on opposite sides, respectively, of said one segment, said two plates carrying two bearings, respectively, which receive the opposite ends of said pinion shaft whereby said pinions are rotatable with respect to said carrier, one pinion meshing with said spur gear, and a gear wheel rotatably and slidably received on said inner shaft, said gear wheel being movable into frictional engagement with said clutch plate and meshing with the other of said pinions.

14. For use in a gear mechanism, a gear train comprising inner and outer coaxial shafts which are relatively rotatable; a planet carrier fixedly secured to the outer shaft for rotation therewith, said carrier having a spur gear-receiving portion, an axially extending pinion-receiving opening in said carrier adjacent to the perimeter thereof; a clutch plate coaxial with said inner shaft and carried by said carrier, means securing said clutch plate against rotation with respect to said carrier; a spur gear received by said gear-receiving portion between said clutch plate and said carrier, said spur gear being coaxially secured to said inner shaft, a pinion mounted on a pinion shaft, said pinion being received by said pinion-receiving opening, two bearing plates mounted on opposite sides, respectively, of said carrier for supporting the opposite ends of said pinion shaft whereby said pinion may be rotated on said carrier, said pinion meshing with said spur gear, and a spur gear wheel rotatably and slidably received on said inner shaft, said gear wheel being movable into frictional engagement with said clutch plate and meshing with said pinion.

15. For use in a gear mechanism, a gear train comprising inner and outer coaxial shafts which are relatively rotatable; a planet carrier fixedly secured to the outer shaft for rotation therewith, said carrier having a spur gear-receiving portion, an axially extending pinion-receiving opening in said carrier adjacent to the perimeter thereof; a clutch plate coaxial with said inner shaft and carried by said carrier, means securing said clutch plate against rotation with respect to said carrier; a spur gear received by said gear-receiving portion between said clutch plate and said carrier, said spur gear being coaxially secured to said inner shaft, a pinion mounted on a pinion shaft, said pinion being received by said pinion-receiving opening, means mounting said pinion shaft on said carrier whereby said pinion may be rotated on said carrier, said pinion meshing with said spur gear, and a spur gear wheel rotatably and slidably received on said inner shaft, said gear wheel being movable into frictional engagement with said clutch plate and meshing with said pinion.

16. For use in a gear mechanism, an open-faced carrier comprising a tubular shaft, a disc coaxially mounted on one end of said shaft, three segments on said disc projecting away from said one end and surrounding a gear-receiving recess, said segments being circumferentially equally spaced apart and provided with clutch-mounting flats therebetween, axially extending clutch-mounting pins on said flats respectively, and an axially extending pinion-receiving opening in one segment, said one segment having an access opening in registry with said recess through which the teeth of a pinion in said pinion-receiving opening and a gear in said recess may mesh.

17. For use in a gear mechanism, an open-faced carrier comprising a tubular shaft, a disc coaxially mounted on one end of said shaft, three segments on said disc projecting away from said one end and surrounding a gear-receiving recess, said segments being circumferentially equally spaced apart and provided with clutch-mounting flats therebetween, an axially extending pinion-receiving opening in one segment, a pinion received by said pinion-receiving opening, said pinion being mounted on a pinion shaft which is disposed parallel to said tubular shaft, and two bearing plates mounted on opposite sides of said one segment, respectively, said bearing plates carrying anti-friction bearings which receive the opposite ends of said pinion shaft, respectively, whereby said pinion is rotatable on said carrier.

References Cited in the file of this patent

UNITED STATES PATENTS

| 2,500,447 | Bitzer | Mar. 14, 1950 |
| 2,722,303 | Utz | Nov. 1, 1955 |
| 2,803,966 | Morris | Aug. 27, 1957 |

FOREIGN PATENTS

| 1,131,927 | France | Oct. 29, 1956 |